United States Patent
Holt et al.

(10) Patent No.: US 11,567,266 B1
(45) Date of Patent: Jan. 31, 2023

(54) ANGLED GRATING COUPLERS WITH INCLINED SIDE EDGE PORTIONS

(71) Applicant: GlobalFoundries U.S. Inc., Malta, NY (US)

(72) Inventors: Judson Holt, Ballston Lake, NY (US); Yusheng Bian, Ballston Lake, NY (US); Qizhi Liu, Lexington, MA (US); Elizabeth Strehlow, Malta, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/551,377

(22) Filed: Dec. 15, 2021

(51) Int. Cl.
| | |
|---|---|
| *G02B 6/34* | (2006.01) |
| *G02B 6/124* | (2006.01) |
| *G02B 6/12* | (2006.01) |
| *G02B 6/293* | (2006.01) |
| *G02B 6/42* | (2006.01) |

(52) U.S. Cl.
CPC .............. *G02B 6/34* (2013.01); *G02B 6/124* (2013.01); *G02B 6/29323* (2013.01); *G02B 6/4215* (2013.01); *G02B 6/4295* (2013.01); *G02B 2006/12107* (2013.01); *G02B 2006/12147* (2013.01); *G02F 2201/302* (2013.01)

(58) Field of Classification Search
None
See application file for complete search history.

(56) References Cited

U.S. PATENT DOCUMENTS 4,776,661 A * 10/1988 Handa ................ G02B 6/12004
385/24
4,935,930 A * 6/1990 Handa ..................... H01S 3/005
385/132
5,116,461 A 5/1992 Lebby et al.
5,657,407 A 8/1997 Li et al.
6,285,813 B1 9/2001 Schultz et al.
7,643,709 B2 1/2010 Van Laere et al.
(Continued)

FOREIGN PATENT DOCUMENTS

EP 1855131 A1 11/2007
EP 3460547 B1 * 12/2021 ........... G02B 6/1228

OTHER PUBLICATIONS

Bian, Yusheng et al., "Optical Antenna for Photonic Integrated Circuit and Methods to Form Same" filed on Mar. 10, 2021, as a U.S. Appl. No. 17/197,133.

(Continued)

*Primary Examiner* — Michelle R Connelly
(74) *Attorney, Agent, or Firm* — Thompson Hine LLP; Anthony Canale (57) ABSTRACT

Structures for a grating coupler and methods of fabricating a structure for a grating coupler. The structure includes a grating coupler having a central portion and edge portions. The central portion and the edge portions define a sidewall, and the central portion and the edge portions have a first longitudinal axis along which the edge portions are arranged in a spaced relationship. Each edge portion projects from the sidewall at an angle relative to the first longitudinal axis. A waveguide core is optically coupled to the grating coupler. The first longitudinal axis is aligned in a first direction, and the waveguide core has a second longitudinal axis that is aligned in a second direction different from the first direction.

20 Claims, 5 Drawing Sheets

(56) References Cited

U.S. PATENT DOCUMENTS

| | | | |
|---|---|---|---|
| 10,585,245 | B1 | 3/2020 | Bian et al. |
| 11,002,916 | B1 * | 5/2021 | Bian ..................... G02B 6/125 |
| 11,105,977 | B1 * | 8/2021 | Puckett .............. G02B 6/29325 |
| 2012/0257490 | A1 | 10/2012 | Zhou |
| 2019/0107672 | A1 | 4/2019 | Jacob |

OTHER PUBLICATIONS

Bian, Yusheng et al., "Optical Antenna With Reflective Material for Photonic Integrated Circuit and Methods to Form Same" filed on Jun. 22, 2021, as a U.S. Appl. No. 17/354,408.

Bian, Yusheng et al., "Distributed Bragg Reflectors Including Periods With Airgaps" filed on Sep. 13, 2021, as a U.S. Appl. No. 17/472,846.

Giewont, K. et al., "300-mm Monolithic Silicon Photonics Foundry Technology," in IEEE Journal of Selected Topics in Quantum Electronics, vol. 25, No. 5, pp. 1-11, Art No. 8200611, doi: 10.1109/JSTQE.2019.2908790 (Sept.Oct. 2019).

Bian, Y. et al., "Towards low-loss monolithic silicon and nitride photonic building blocks in state-of-the-art 300mm CMOS foundry," in Frontiers in Optics / Laser Science, OSA Technical Digest (Optical Society of America, 2020), paper FW5D.2.

Rakowski, M. et al., "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.

Aboketaf, A. et al., "Towards fully automated testing and characterization for photonic compact modeling on 300-mm wafer platform," in Optical Fiber Communication Conference (OFC) 2021, OSA Technical Digest (Optical Society of America, 2021), paper W6A.1.

Bian, Y. et al., "Monolithically integrated silicon nitride platform," in Optical Fiber Communication Conference (OFC) 2021, OSA Technical Digest (Optical Society of America, 2021), paper Th1A.46.

* cited by examiner

ANGLED GRATING COUPLERS WITH INCLINED SIDE EDGE PORTIONS

BACKGROUND

This disclosure relates to photonics chips and, more specifically, to structures for a grating coupler and methods of fabricating a structure for a grating coupler.

Photonics chips are used in many applications and systems including, but not limited to, data communication systems and data computation systems. A photonics chip integrates optical components, such as waveguides, photodetectors, modulators, and optical power splitters, and electronic components, such as field-effect transistors, into a unified platform. Factors such as layout area, cost, and operational overhead may be reduced by the integration of both types of components on the same chip.

Grating couplers are commonly used in photonics chips to provide antennas in Light Detection and Ranging (LiDAR) systems, as well as to provide antennas for phased arrays. Grating couplers can direct pulsed light off-chip at a given emission angle or receive pulsed light. Conventional grating couplers may have low efficiencies or lack compactness, and may not be robust to fabrication variability.

Improved structures for a grating coupler and methods of fabricating a structure for a grating coupler are needed.

SUMMARY

In an embodiment, a structure includes a grating coupler having a central portion and a plurality of edge portions. The central portion and the plurality of edge portions define a sidewall, and the central portion and the plurality of edge portions have a first longitudinal axis along which the plurality of edge portions are arranged in a spaced relationship. Each of the plurality of edge portions projects from the sidewall at an angle relative to the first longitudinal axis. The structure further includes a waveguide core optically coupled to the grating coupler. The first longitudinal axis is aligned in a first direction, and the waveguide core has a second longitudinal axis that is aligned in a second direction different from the first direction.

In an embodiment, a method includes forming a grating coupler including a central portion and a plurality of edge portions. The central portion and the plurality of edge portions define a sidewall, and the central portion and the plurality of edge portions have a first longitudinal axis along which the plurality of edge portions are arranged in a spaced relationship. Each of the plurality of edge portions projects from the sidewall at an angle relative to the first longitudinal axis. The method further includes forming a waveguide core optically coupled to the grating coupler. The waveguide core has a second longitudinal axis, the first longitudinal axis is aligned in a first direction, and the second longitudinal axis is aligned in a second direction different from the first direction.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
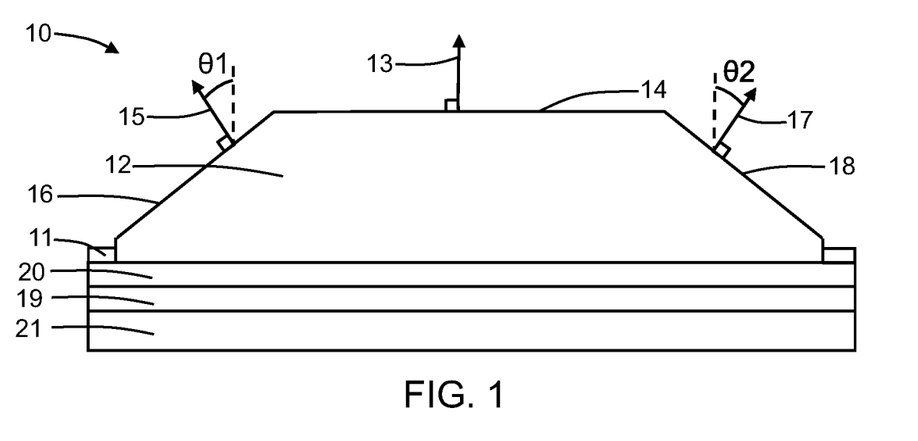
FIGS. 1-4 are cross-sectional views of a structure at successive fabrication stages of a processing method in accordance with embodiments of the invention.

With reference to FIG. 1 and in accordance with embodiments of the invention, a structure 10 includes a semiconductor layer 12 that is formed on a portion of a waveguide core 20. The semiconductor layer 12 may define a raised mesa-like structure that is faceted with multiple surfaces 14, 16, 18 that have a given angled arrangement relative to each other. The surface 14 may represent a topmost surface of the semiconductor layer 12, and the surface 16 may be connected to the surface 18 by the surface 14. The waveguide core 20 may be formed by patterning the device layer of a silicon-on-insulator (SOI) substrate, which further includes a handle substrate 21 and a buried insulator layer 19 arranged to separate the device layer from the handle substrate 21.

The semiconductor layer 12 may be comprised of a semiconductor material, such as silicon, germanium, or silicon-germanium, that is formed by a selective epitaxial growth process from a surface area of the waveguide core 20 that is exposed inside a window patterned in a dielectric hardmask 11. In that regard, the surfaces 16, 18 may be facets having an inclined orientation arising because of growth rates during the selective epitaxial growth process that are crystal-direction dependent. The composition of the semiconductor layer 12 may be uniform over its volume.

The semiconductor layer 12 contains single-crystal semiconductor material characterized by multiple crystalline orientations arising from the crystal-direction-dependent growth rates. The surface 14 has a surface normal 13, which may be collinear with the surface normal of the portion of the waveguide core 20 on which the semiconductor layer 12 is formed. The surface 16, which is faceted, has a surface normal 15 that is inclined at an angle θ1 relative to the surface normal 13 of the surface 14. The surface 18, which is also faceted, has a surface normal 17 that is inclined at an angle θ2 relative to the surface normal 13 of the surface 14. In an embodiment, the angle θ1 and the angle θ2 may be equal. In an embodiment, the surface normal 15 to the surface 16 and the surface normal 17 to the surface 18 may be oriented in a <111> direction of the crystal lattice structure of the semiconductor layer 12, and the surface normal 13 to the surface 14 may be oriented in a <100> direction of the crystal lattice structure of the semiconductor layer 12. The semiconductor layer 12 may be embodied in a three-dimensional mesa or mound in which the surface 14 is a top surface spaced above the waveguide core 20, and the surfaces 16, 18 are connected by additional faceted surfaces that collectively surround the perimeter of the surface 14.

Figure 2:
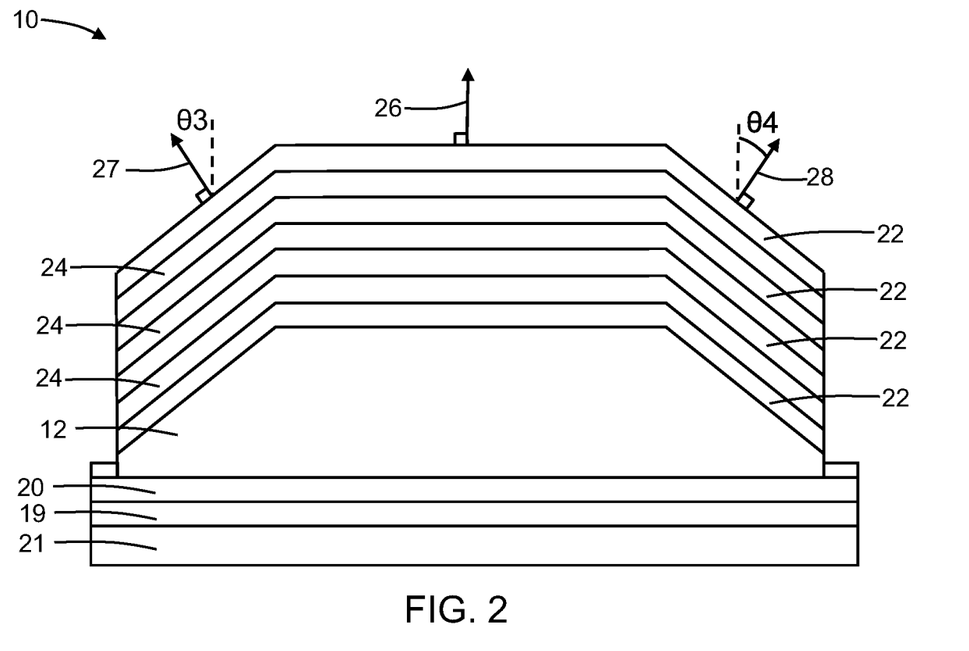

With reference to FIG. 2 in which like reference numerals refer to like features in FIG. 1 and at a subsequent fabrication stage, alternating semiconductor layers 22, 24 containing different semiconductor materials are formed on the semiconductor layer 12 by an epitaxial growth process. The semiconductor layers 22 and semiconductor layers 24 are arranged in a layer stack that defines an epitaxial superlattice structure. The semiconductor layers 22 and the semiconductor layers 24 are thinner than the semiconductor layer 12, which provides a support structure with established crystal orientations and/or inclination angles for the formation of the thinner semiconductor layers 22, 24. The different crystal orientations and/or inclination angles of the semiconductor layer 12 are reproduced in the semiconductor layers 22, 24. The number of pairs of the semiconductor layers 22, 24 may differ from the number depicted in the representative embodiment.

The semiconductor layers 22 and the semiconductor layers 24 are tailored in composition to permit selective etching of the semiconductor layers 22 relative to the semiconductor layers 24. As used herein, the term "selective" in reference to a material removal process (e.g., etching) denotes that, with an appropriate etchant choice, the material removal rate (i.e., etch rate) for the targeted material is greater than the removal rate for at least another material exposed to the material removal process. In an embodiment, the semiconductor layers 22 and the semiconductor layers 24 may be comprised of silicon containing different concentrations of a dopant, such as boron. In an embodiment, the semiconductor layers 22 may contain a higher concentration of the dopant than the semiconductor layers 24. In an embodiment, the semiconductor layers 22 may be heavily doped with a dopant, such as boron, and the semiconductor layers 24 may be undoped. In an embodiment, the semiconductor layers 22 may be comprised of silicon-germanium and the semiconductor layers 24 may be comprised of silicon. In an embodiment, the semiconductor layers 22 may be comprised of silicon-germanium with a germanium content of twenty-five percent (25%) to thirty-five percent (35%), and the semiconductor layers 24 may lack a germanium content. The difference in either dopant concentration or germanium content may permit the semiconductor layers 22 to be etched selective to the semiconductor layers 24.

The thicknesses of the semiconductor layers 22 and the thicknesses of the semiconductor layers 24 are tunable and capable of being independently selected due to their individual formation. In an embodiment, the thicknesses of all semiconductor layers 22 may be nominally equal, and the thicknesses of all semiconductor layers 24 may be nominally equal. In an embodiment, the thicknesses of all semiconductor layers 22 may be nominally equal, the thicknesses of all semiconductor layers 24 may be nominally equal, and the thicknesses of the semiconductor layers 22 may be nominally equal to the thicknesses of the semiconductor layers 24.

All of the semiconductor layers 22, 24 may adopt the faceting and inclination angle of the surfaces 14, 16, 18 (FIG. 1) of the semiconductor layer 12. In that regard, each semiconductor layer 22 includes a section on the surface 14 of the semiconductor layer 12, a section on the surface 14 of the semiconductor layer 12, and a section on the surface 18 of the semiconductor layer 12, and each semiconductor layer 24 includes a section on the surface 14 of the semiconductor layer 12, a section on the surface 14 of the semiconductor layer 12, and a section on the surface 18 of the semiconductor layer 12. The sections of the semiconductor layers 22, 24 on the surfaces 16, 18 may be angled relative to the sections of the semiconductor layers 22, 24 on the surface 14 with inclinations established by the angling of the surfaces 14, 16, 18. The semiconductor layers 22, 24 contain single-crystal semiconductor material characterized by multiple crystalline orientations.

The sections of the semiconductor layers 22, 24 on the surface 14 have a surface normal 26. The sections of the semiconductor layers 22, 24 on the surface 16 have a surface normal 27 that is inclined at an angle $\theta 3$ relative to the surface normal 26 of the sections of the semiconductor layers 22, 24 on the surface 14. The sections of the semiconductor layers 22, 24 on the surface 18 have a surface normal 28 that is inclined at an angle $\theta 4$ relative to the surface normal 26 of the sections of the semiconductor layers 22, 24 on the surface 14. In an embodiment, the inclination angle $\theta 3$ may be equal to the inclination angle $\theta 4$. In an embodiment, the inclination angle $\theta 3$ may be equal to the inclination angle $\theta 1$ (FIG. 1), and the inclination angle $\theta 4$ may be equal to the inclination angle $\theta 2$ (FIG. 1).

Figure 3:
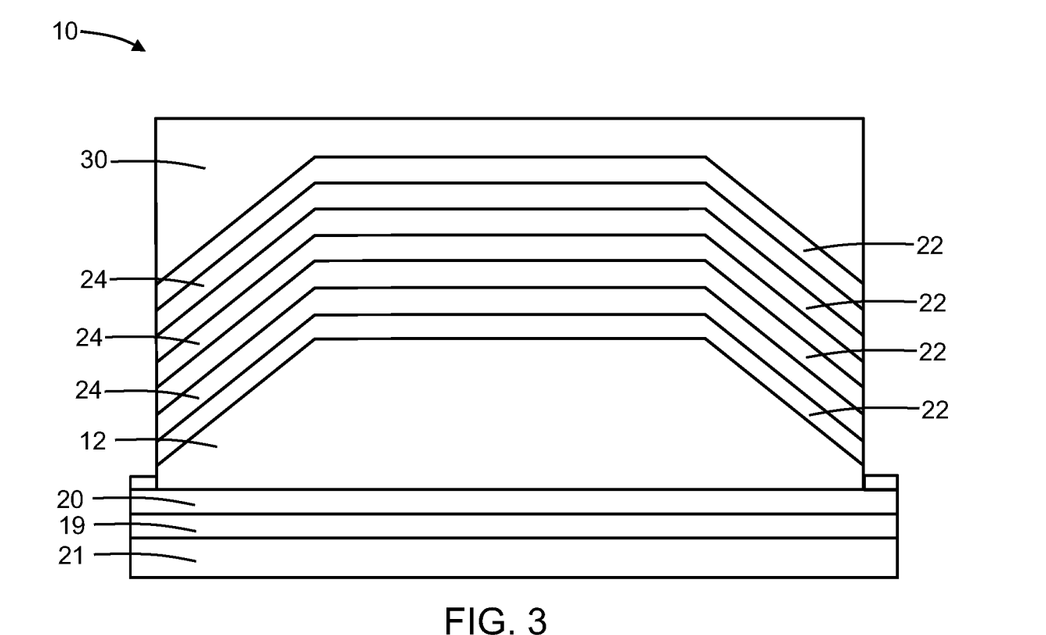

With reference to FIG. 3 in which like reference numerals refer to like features in FIG. 2 and at a subsequent fabrication stage, a cap layer 30 may be formed over the semiconductor layers 22, 24. The cap layer 30 may be comprised of a dielectric material, such as silicon nitride, or a different inert material.

Figure 4:
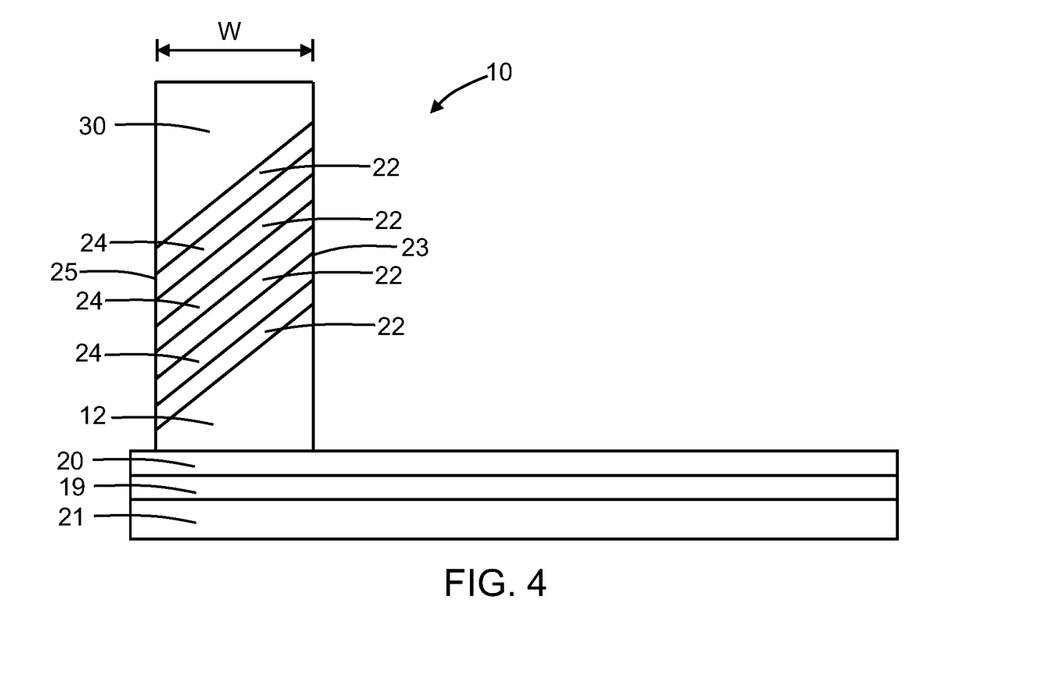

With reference to FIG. 4 in which like reference numerals refer to like features in FIG. 3 and at a subsequent fabrication stage, the cap layer 30 and the semiconductor layers 22, 24 are patterned to define a width W for the angled grating coupler of the structure 10. In the representative embodiment, the sections of the semiconductor layers 22, 24 on the surface 14 and the sections of the semiconductor layers 22, 24 on the surface 18 may be fully removed by the patterning, as well as the portion of the semiconductor layer 12 including the surface 14 and the surface 18. Following patterning, the semiconductor layers 22, 24 include a sidewall 23 and a sidewall 25 that is opposite to the sidewall 23.

Figure 5:
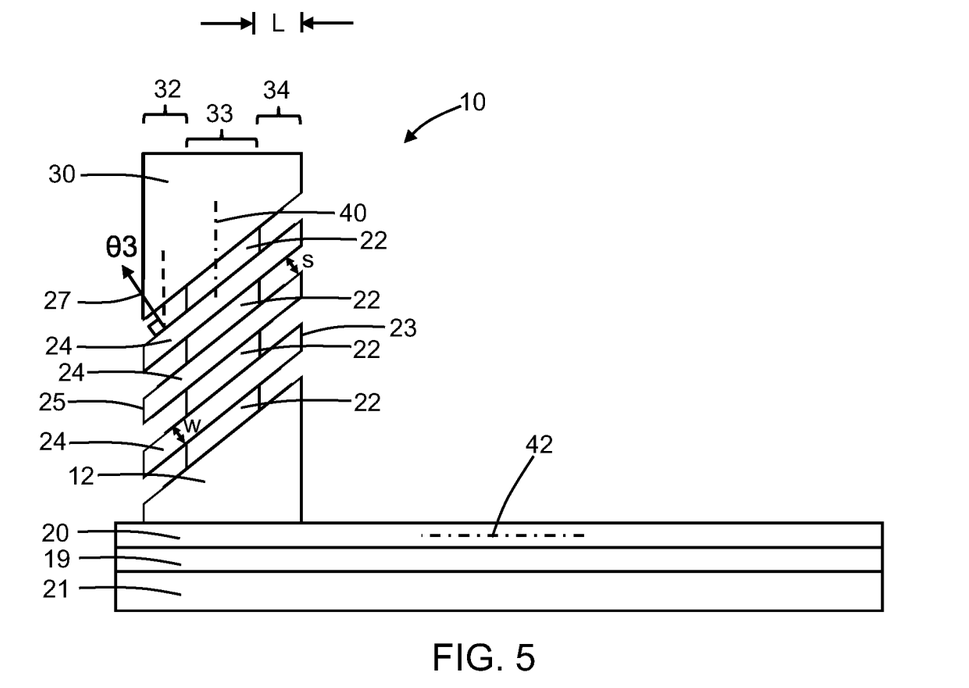
FIGS. 5-9 are cross-sectional views of structures in accordance with alternative embodiments of the invention.

With reference to FIG. 5 in which like reference numerals refer to like features in FIG. 4 and at a subsequent fabrication stage, the semiconductor layers 22 are laterally recessed relative to the semiconductor layers 24 with an etching process that etches the semiconductor material constituting the semiconductor layers 22 selective to the semiconductor material constituting the semiconductor layers 24. The lateral recessing of the semiconductor layers 22 generates indents in the sidewalls 23, 25 because the semiconductor layers 24 are not laterally recessed due to the etch selectivity of the etching process. The etching process may be a wet etching process, such as a potassium hydroxide etching process. In an alternative embodiment, the etching process may be a reactive ion etching process.

The structure 10 includes angled gratings of an angled grating coupler that are produced by the lateral recessing of the semiconductor layers 22. Side edge portions 32 of the semiconductor layers 24 project laterally outward at the sidewall 23 relative to the shortened semiconductor layers 22. The side edge portions 32 define grating features of one of the angled gratings included in the angled grating coupler. The structure 10 further includes side edge portions 34 of the semiconductor layers 24 that project laterally outward at the sidewall 25 relative to the shortened semiconductor layers 22. The side edge portions 34 define grating features of another of the angled gratings included in the angled grating coupler.

The semiconductor layers 22 and the semiconductor layers 24 contribute to form a central portion 33 that is laterally positioned between the side edge portions 32 and the side edge portions 34. The central portion 33 defines a continuous central core region (i.e., spine) of the grating coupler in which the semiconductor layers 22 and the semiconductor layers 24 alternate with each other in a vertical direction. The sidewall 23 is contoured to follow the profile of the side surfaces of the central portion 33 and the side edge portions 34, and the sidewall 25 is contoured to follow the profile of the side surfaces of the central portion 33 and the side edge portions 34.

The side edge portions 32 of the semiconductor layers 24 project outwardly from the central portion 33 at the sidewall 23, and the side edge portions 34 of the semiconductor layers 24 project outwardly from the central portion 33 at the sidewall 25. The shortened semiconductor layers 22 provide bridges in the central portion 33 that connect adjacent semiconductor layers 24. The degree of the lateral recessing defines the length L of the side edge portions 32, 34 of the semiconductor layers 24. The side edge portions 32, 34 have a width w that may be nominally equal to the thickness of the semiconductor layers 24.

The central portion 33 of the angled grating coupler extends with alignment along a longitudinal axis 40. The waveguide core 20 coupled to the angled grating coupler extends with alignment along a longitudinal axis 42. The longitudinal axis 42 of the waveguide core 20 may be oriented in a given direction in a coordinate frame, and the longitudinal axis 40 of the angled grating coupler may be oriented in a different given direction in the coordinate frame. In an embodiment, the longitudinal axis 42 of the waveguide core 20 may be oriented in a horizontal direction, and the longitudinal axis 40 of the angled grating coupler may be oriented in a vertical direction. In an embodiment, the longitudinal axis 42 may be oriented transverse to the longitudinal axis 40.

The side edge portions 32 of the semiconductor layers 24 are inclined at the angle θ3 relative to the longitudinal axis 40, and the side edge portions 34 of the semiconductor layers 24 are also inclined at the angle θ3 relative to the longitudinal axis 40. The side edge portions 32 of the semiconductor layers 24 are spaced apart in a spaced relationship along the longitudinal axis 40, and the side edge portions 34 of the semiconductor layers 24 are also spaced apart in a spaced relationship along the longitudinal axis 40. In that regard, the side edge portions 32, 34 of the semiconductor layers 24 have a spacing s in a vertical direction. The spacing s may be nominally equal to the thicknesses of the semiconductor layers 22. In an embodiment, the spacing s between the side edge portions 32 may be uniform, the spacing s between the side edge portions 34 may be uniform, and the spacing s between the side edge portions 32 may be equal to the spacing s between the side edge portions 34.

The structure 10 may be employed, for example, as an antenna. The side edge portions 32, 34 of the semiconductor layers 24, which are spaced apart in a vertical direction, provide angled grating couplers of the antenna. In that regard, the angled grating couplers of the structure 10 may emit light optically coupled from the waveguide core 20 as optical signals into free space. Alternatively, the angled grating couplers of the structure 10 may receive light arriving as optical signals arriving from a remote light source and optically couple the received light to the waveguide core 20.

The structure 10 may exhibit an improved coupling efficiency as an antenna through the angling of the side edge portions 32, 34 of the semiconductor layers 24, which may be adjusted to optimize constructive interference. The structure 10 may exhibit an expanded field of view for LiDAR applications, as well as an expanded angular range for transmission of optical signals, in comparison with conventional antennas.

Figure 6:
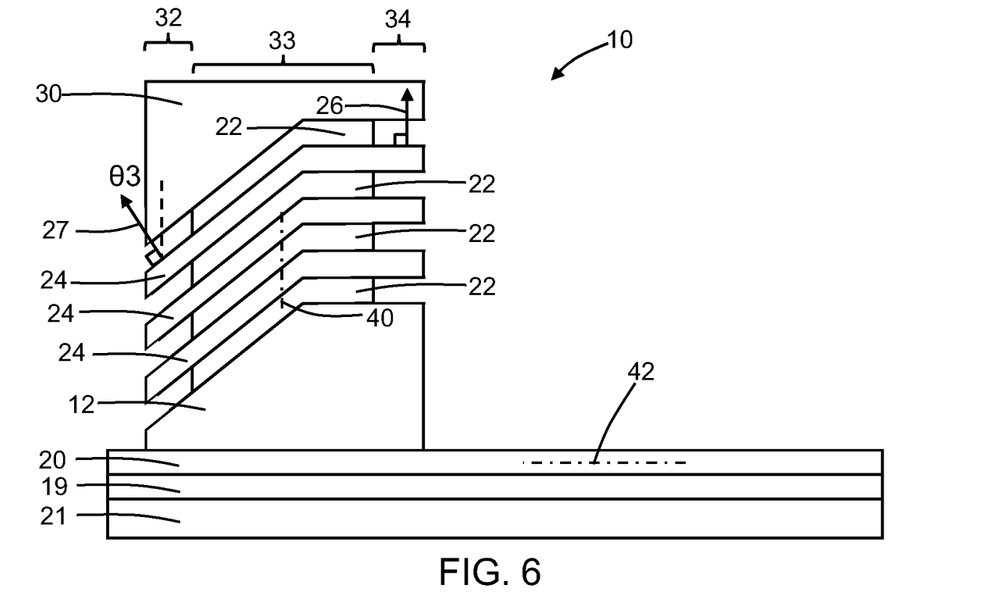

With reference to FIG. 6 and in accordance with alternative embodiments, the cap layer 30 and the semiconductor layers 22, 24 may be patterned to change the width of the structure 10. For example, the section of the semiconductor layers 22, 24 on the surface 18 may be fully removed by the patterning, and the sections of the semiconductor layers 22, 24 on the surface 14 may only be partially removed by the patterning. The semiconductor layers 22 are laterally recessed relative to the semiconductor layers 24 to provide the side edge portions 32, 34. The sections of the semiconductor layers 22, 24 on the surface 16 of the semiconductor layer 12, and the side edge portions 32 of the semiconductor layers 24, are inclined at the angle θ1 (FIG. 3) relative to the surface normal 26. The sections of the semiconductor layers 22, 24 on the surface 14 of the semiconductor layer 12, and the side edge portions 34 of the semiconductor layers 24, have a surface normal 26 that is aligned with the longitudinal axis 40 and therefore are aligned at a different inclination angle than the side edge portions 32. Hence, the structure 10 includes an angled grating provided by the side edge portions 32 and a non-angled grating provided by the side edge portions 34. The combination of angled and non-angled gratings may be effective to increase the omni-directionality of the antenna, which may permit greater coupling to various on-axis and off-axis optical signals.

Figure 7:
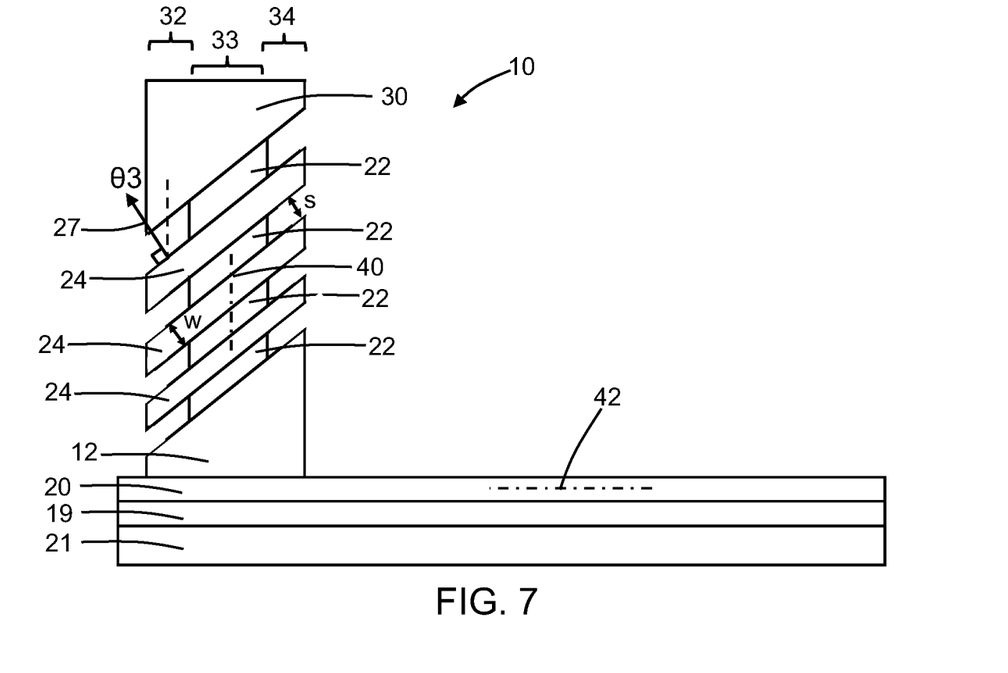

With reference to FIG. 7 and in accordance with alternative embodiments, the thickness of the semiconductor layers 24 may be varied during epitaxial growth such that, after patterning and lateral recessing, the side edge portions 32, 34 of the semiconductor layers 24 have a width w that varies with vertical position along the longitudinal axis 40. In an embodiment, the width w of the side edge portions 32, 34 of the semiconductor layers 24 may increase with increasing distance from the waveguide core 20.

The thickness t of the semiconductor layers 22 may also be varied during epitaxial growth such that, after patterning and lateral recessing, the side edge portions 32, 34 of the semiconductor layers 24 have a spacing s that varies with vertical position along the longitudinal axis 40. In an embodiment, the aperiodic spacing s between the side edge portions 32, 34 of the semiconductor layers 24 may increase with increasing distance from the waveguide core 20.

The width variation and/or spacing variation of the angled gratings may be effective to improve the antenna sensitivity to optical signals having a broader range of incoming wavelengths.

Figure 8:
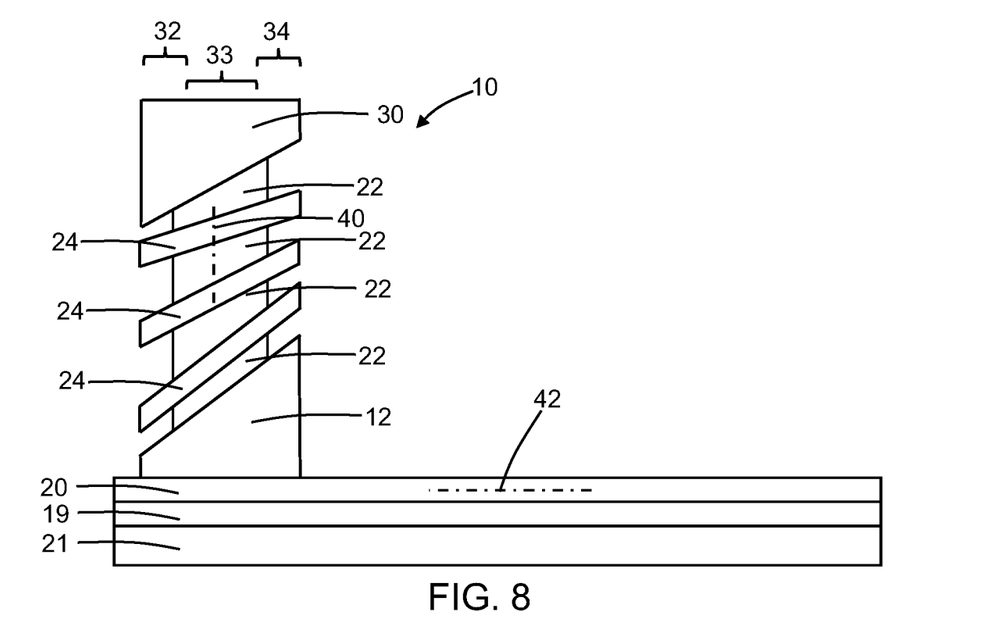

With reference to FIG. 8 and in accordance with alternative embodiments, the sections of the semiconductor layers 22, 24, which are epitaxially grown on the surface 16, may have an inclination angle θ3 (FIG. 2) that varies with vertical position. In the representative embodiment, the inclination angle θ3 may decrease with increasing distance along the longitudinal axis 40 from the waveguide core 20. The variation in the inclination angle θ3 may be produced by changing the epitaxial growth conditions and/or the structure of the waveguide core 20. For example, in order to vary the inclination angle θ3, the surface normal 27 of the sections of the semiconductor layers 22, 24 on the surface 16 may be changed from an orientation in the <111> direction of the crystal lattice structure to an orientation in the <311> direction of the crystal lattice structure through a change in epitaxial growth conditions.

The side edge portions 32, 34 of the semiconductor layers 24 providing the angled gratings exhibit an angular variation. The angular variation of the angled gratings may be effective to increase the omni-directionality of the antenna, which may permit greater coupling to various on-axis and off-axis optical signals.

Figure 9:
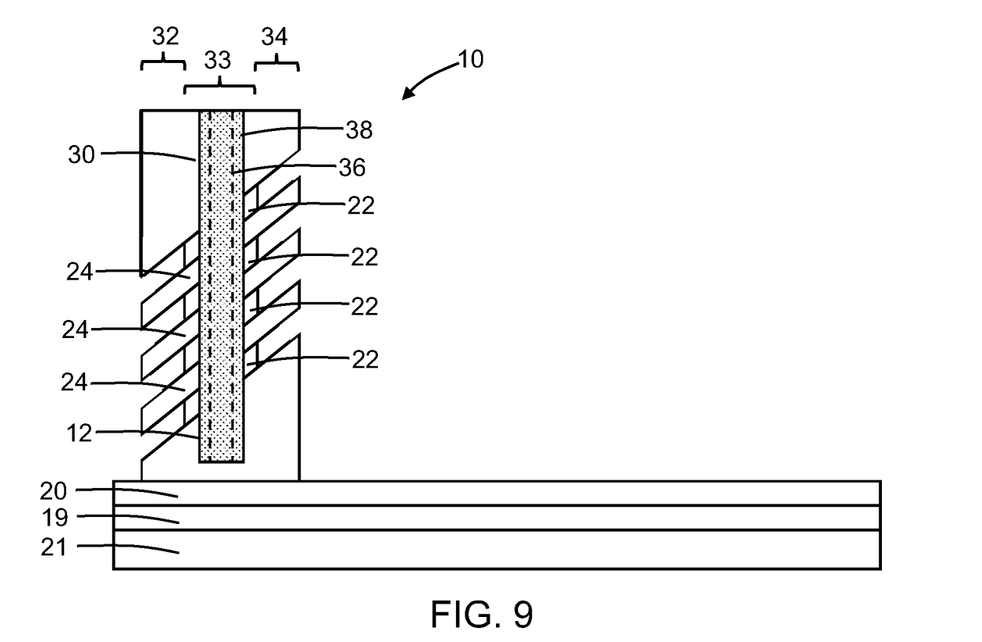

With reference to FIG. 9 and in accordance with alternative embodiments, the structure 10 may be modified to add a reflector 36 and a waveguide core 38 as optical components. In an alternative embodiment, the structure 10 may be modified to only add the reflector 36 as an optical component. In an alternative embodiment, the structure 10 may be modified to only add the waveguide core 38 as an optical component. The reflector 36 may be comprised of a metal and may be formed in a shallow trench patterned in the central portion 33. The waveguide core 38 may be comprised of a dielectric material, such as silicon nitride, and may likewise be formed in a shallow trench patterned in the central portion 33. The reflector 36 may function to increase antenna sensitivity by increasing the light coupling by reflecting incident light that is not captured by the angled gratings in a direction back toward the angled gratings. The waveguide core 38 may improve the coupling of the antenna into the waveguide core 20.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a grating coupler including a first plurality of semiconductor layers, a second plurality of semiconductor layers, a central portion, and a first plurality of edge portions, the central portion and the first plurality of edge portions defining a first sidewall, the central portion and the first plurality of edge portions having a first longitudinal axis along which the first plurality of edge portions are arranged in a first spaced relationship, the first longitudinal axis aligned in a first direction, each of the first plurality of edge portions projecting from the first sidewall at a first angle relative to the first longitudinal axis, the first plurality of semiconductor layers and the second plurality of semiconductor layers alternating in a layer stack along the first longitudinal axis, and the second plurality of semiconductor layers recessed at the first sidewall relative to the first plurality of semiconductor layers such that the first plurality of semiconductor layers define the first plurality of edge portions; and
a waveguide core optically coupled to the grating coupler, the waveguide core having a second longitudinal axis, and the second longitudinal axis aligned in a second direction different from the first direction.

2. The structure of claim 1 wherein the grating coupler includes a second plurality of edge portions, the central portion and the second plurality of edge portions define a second sidewall opposite the first sidewall, the second plurality of edge portions are arranged in a second spaced relationship along the first longitudinal axis, and each of the second plurality of edge portions projects from the second sidewall at a second angle relative to the first longitudinal axis.

3. The structure of claim 2 wherein the first angle is equal to the second angle.

4. The structure of claim 1 wherein the grating coupler includes a second plurality of edge portions that are connected by the central portion, the central portion and the second plurality of edge portions define a second sidewall opposite to the first sidewall, the second plurality of edge portions are arranged in a second spaced relationship along the first longitudinal axis, and each of the second plurality of edge portions projects from the second sidewall transverse to the first longitudinal axis.

5. The structure of claim 1 wherein the first angle varies with position along the first longitudinal axis.

6. The structure of claim 1 wherein the first plurality of edge portions have a spacing in the first direction that varies with position along the first longitudinal axis.

7. The structure of claim 1 wherein the first plurality of edge portions have equal first angles.

8. The structure of claim 1 wherein the first plurality of semiconductor layers comprise silicon, and the second plurality of semiconductor layers comprise silicon-germanium.

9. The structure of claim 1 wherein the first plurality of semiconductor layers comprise silicon with a first concentration of a dopant, and the second plurality of semiconductor layers comprise silicon with a second concentration of the dopant that is greater than the first concentration of the dopant.

10. The structure of claim 1 further comprising:
an optical component adjacent to the central portion of the grating coupler, the optical component aligned with the first longitudinal axis.

11. The structure of claim 1 wherein the first direction is a vertical direction, and the second direction is a horizontal direction.

12. The structure of claim 1 wherein the first direction is oriented transverse to the second direction.

13. A structure comprising:
a grating coupler including a central portion and a first plurality of edge portions, the central portion and the first plurality of edge portions defining a first sidewall, the central portion and the first plurality of edge portions having a first longitudinal axis along which the first plurality of edge portions are arranged in a first spaced relationship, the first longitudinal axis aligned in a first direction, and each of the first plurality of edge portions projecting from the first sidewall at a first angle relative to the first longitudinal axis;
a waveguide core optically coupled to the grating coupler, the waveguide core having a second longitudinal axis, and the second longitudinal axis aligned in a second direction different from the first direction; and
a faceted semiconductor layer positioned in the first direction between the waveguide core and the central portion of the grating coupler.

14. The structure of claim 13 wherein the faceted semiconductor layer includes a surface that is inclined at the first angle, and the grating coupler is positioned on the surface of the faceted semiconductor layer.

15. The structure of claim 13 wherein the first plurality of edge portions have equal first angles.

16. The structure of claim 13 wherein the first direction is a vertical direction, and the second direction is a horizontal direction.

17. A method comprising:
forming a grating coupler including a central portion and a first plurality of edge portions, wherein the central portion and the first plurality of edge portions define a first sidewall, the central portion and the first plurality of edge portions have a first longitudinal axis along which the first plurality of edge portions are arranged in a first spaced relationship, and each of the first plurality of edge portions projects from the first sidewall at a first angle relative to the first longitudinal axis; and
forming a waveguide core optically coupled to the grating coupler, wherein the waveguide core has a second longitudinal axis, the first longitudinal axis is aligned in a first direction and the second longitudinal axis is aligned in a second direction different from the first direction, and
wherein forming the grating coupler including the central portion and the first plurality of edge portions comprises:
epitaxially growing a layer stack including a first plurality of semiconductor layers and a second plurality of semiconductor layers that alternate with the first plurality of semiconductor layers in the first direction along the first longitudinal axis; and
recessing the second plurality of semiconductor layers relative to the first plurality of semiconductor layers at the first sidewall such that the first plurality of semiconductor layers define the first plurality of edge portions.

18. The method of claim 17 wherein the grating coupler includes a second plurality of edge portions, the central portion and the second plurality of edge portions define a second sidewall opposite the first sidewall, the second plurality of edge portions are arranged in a second spaced relationship along the first longitudinal axis, and each of the second plurality of edge portions projects from the second sidewall at a second angle relative to the first longitudinal axis.

19. The method of claim 17 wherein the first angle varies with position along the first longitudinal axis.

20. The method of claim 17 wherein the first plurality of edge portions have a spacing in the first direction that varies with position along the first longitudinal axis.

* * * * *